(12) United States Patent
Bastiman

(10) Patent No.: US 11,960,531 B2
(45) Date of Patent: Apr. 16, 2024

(54) CONTENT ANALYSIS

(71) Applicant: Qubeeo Ltd, Brighton (GB)

(72) Inventor: Janet Bastiman, Brighton (GB)

(73) Assignee: Qubeeo Ltd., Brighton (GB)

( * ) Notice: Subject to any disclaimer, the term of this patent is extended or adjusted under 35 U.S.C. 154(b) by 652 days.

(21) Appl. No.: 17/251,548

(22) PCT Filed: Jun. 12, 2019

(86) PCT No.: PCT/EP2019/065377
§ 371 (c)(1),
(2) Date: Dec. 11, 2020

(87) PCT Pub. No.: WO2019/238769
PCT Pub. Date: Dec. 19, 2019

(65) Prior Publication Data
US 2021/0256301 A1    Aug. 19, 2021

(30) Foreign Application Priority Data

Jun. 13, 2018  (GB) .................................... 1809702

(51) Int. Cl.
*G06F 16/583*  (2019.01)
*G06F 18/20*  (2023.01)
(Continued)

(52) U.S. Cl.
CPC .......... *G06F 16/583* (2019.01); *G06F 18/217* (2023.01); *G06F 18/24317* (2023.01);
(Continued)

(58) Field of Classification Search
CPC ............. G06V 10/809; G06V 10/7625; G06V 10/764; G06V 10/82
See application file for complete search history.

(56) References Cited

U.S. PATENT DOCUMENTS

| | | | |
|---|---|---|---|
| 2005/0185845 A1* | 8/2005 | Luo ...................... | G06V 10/809 382/190 |
| 2009/0327200 A1* | 12/2009 | Smith .................... | G06V 20/40 707/999.005 |

(Continued)

OTHER PUBLICATIONS

International Search Report from International Patent Application No. PCT/EP2019/065377, dated Aug. 27, 2019.

*Primary Examiner* — Ross Varndell
(74) *Attorney, Agent, or Firm* — Dergosits & Noah LLP; Todd A. Noah

(57) ABSTRACT

In one aspect a computer-implemented method of processing a content item to extract information from the content item comprises steps of: receiving the content item at a processing stage; and determining whether the content item satisfies a predetermined content condition, by i) providing content of the content item to a plurality of content analysers, each of which applies machine learning content analysis thereto, in order to make an independent determination of whether that predetermined content condition is satisfied, and provides a confidence score for that independent determination, and ii) making an overall determination of whether the content item satisfies that predetermined content condition based on the confidence scores provided by the content analysers for their respective independent determinations.

14 Claims, 8 Drawing Sheets

(51) Int. Cl.
*G06F 18/21* (2023.01)
*G06F 18/243* (2023.01)
*G06N 20/00* (2019.01)
*G06V 10/762* (2022.01)

(52) U.S. Cl.
CPC .......... *G06F 18/285* (2023.01); *G06N 20/00* (2019.01); *G06V 10/7625* (2022.01)

(56) References Cited

U.S. PATENT DOCUMENTS

| | | |
|---|---|---|
| 2012/0084859 A1 | 4/2012 | Radinsky et al. |
| 2017/0024372 A1 | 1/2017 | Bojja et al. |
| 2017/0083825 A1* | 3/2017 | Battersby ............... G06N 20/00 |

* cited by examiner

```
                                                    400
'classifiers': {
                    'porsche-model': {                                          ⎫
        403 ──▶ 'confidence': 0.1, # Results returned over this confidence      ⎪
                    'story': {'url_name': 'bar-story'},                         ⎬ 402
                    'subclassifiers':                                           ⎪
                    [{                                                          ⎭
                        'trigger': {'confidence': 0.35, 'key': "Boxster"}, # only execute ⎫ 404
sub classifiers if the key is found over this score                                       ⎭
                        'p-boxster-number': {                  ⎫
                            'classifiers': {                   ⎪
        407 ──▶         'confidence': 0.1,                     ⎬ 406
                            'subclassifiers':                  ⎪
                            [{                                 ⎭
                                'trigger': {'confidence': 0.35, 'key': "981"}, ⎫ 410a
                                'classifiers': {                               ⎫
                                    'p-boxster-981': {         ⎬ 412a
                                        'confidence': 0.1,     ⎭
                                    }
                                }
                            },
                            {
                                'trigger': {'confidence': 0.35, 'key': "718"}, ⎫ 410b
                                'classifiers': {                               ⎫
                                    'p-boxster-718': {         ⎬ 412b
                                        'confidence': 0.1,     ⎭
                                    }
                                }
                            },
                            {
                                'trigger': {'confidence': 0.35, 'key': "986"}, ⎫ 410c
                                'classifiers': {                               ⎫
                                    'p-boxster-986': {         ⎬ 412c
                                        'confidence': 0.1,     ⎭
                                    }
                                }
                            },
                            {
                                'trigger': {'confidence': 0.35, 'key': "987"}, ⎫ 410d
                                'classifiers': {                               ⎫
                                    'p-boxster-987': {         ⎬ 412d
                                        'confidence': 0.1,     ⎭
                                    }
                                }
                            }
                            }]
                        }
                    }
```

FIG. 4A

CONTENT ANALYSIS

CLAIM OF PRIORITY

This application is a U.S. National Phase of International Patent Application No. PCT/EP2019/065377, filed Jun. 12, 2019, which claims priority to Great Britain Patent Application No. 1809702.2, filed Jun. 13, 2018, the contents of which are hereby incorporated by reference in their entireties.

TECHNICAL FIELD

This disclosure relates to the analysis of content items based on machine learning.

BACKGROUND

In recent years, there has been a proliferation of sophisticated machine learning (ML) techniques that can be used for performing complex analysis of content and other data. This has been driven in part by hardware developments that have provided powerful processing platforms on which complex and computationally expensive ML algorithms can be applied to large volumes of data in a practical context, and in part by innovations in the ML processes themselves.

One example is computer vision, where the ability of a computer to analyse and interpret images accurately can rival or exceed that of a human in certain contexts. A particular class of computer vision is image recognition, which refers to the detection of objects and other visual structure within images. Modern image recognition techniques, such as those based on convolutional neural networks and other deep learning architectures, are able to achieve exceptionally high accuracy when applied to popular benchmarking image datasets. Similar improvements in accuracy have also been achieved in other areas of content analysis (such as audio or text interpretation) using modern ML processing.

As alluded to in the preceding paragraph, accuracy in the field of machine learning is often measured with reference to labelled public benchmarking datasets. In supervised ML, an ML model learns how to interpret unlabelled inputs (images, video, audio segments, documents etc.) from labelled examples of comparable inputs in a structured training process. The accuracy of a trained ML model is often assessed based on is performance when applied to a public benchmarking dataset; that is, based on the extent to which the outputs of the model, when applied to the benchmarking data, match the labels associated with those data. The benchmarking dataset is separate from the data used to train the model, and contains examples the model did not encounter during training, with the aim of testing the ability of the model to generalize its learning to examples outside of its training set—a form of validation as that term is used in the art.

Another important aspect of ML performance is confidence. Many ML models, such as probabilistic or other score-based classifiers (or any classifier from which a meaningful measure of confidence can be extracted), will provide, when applied to an input, one or more confidence scores in the resulting output, indicating how confident the model is its ability to interpret the input. Confidence can also be used in assessing performance on a validation dataset, on the basis that a well-performing model should generally exhibit a high level of confidence in its outputs across the validation dataset.

SUMMARY

Although cutting edge ML models are able to achieve excellent results when applied to popular benchmarking datasets, this does not always translate into the same level of performance in the field. In particular, certain high-performing models are, by and large, not able to attain the same levels of confidence in their outputs in a real-word content as they are when applied to benchmark data. This is particularly true of ML models that are trained to perform highly-specific (fine grained) tasks, such as recognizing highly specific visual structure elements, where the visual distinctions between different visual structure elements that need to be distinguished are subtle. Detecting such subtle variations in visual and other content with sufficient confidence is a particular challenge.

The present invention addresses this issue with a combinatorial decision making approach. This is based on the realization that, when two or more ML models—which have been independently configured to perform the same task—arrive at the same result independently when applied to a particular input, each with a relatively low level of confidence, an overall confidence level can be attributed to that result that is significantly higher than either of the individual confidence levels, by virtue of the fact that two independently configured ML models agree with each other. Independently configured in this context means models which have independently constructed architectures and/or which have been independently trained.

In the context of the present invention, the task is content analysis, and in particular determining whether a content item satisfies a predetermined content condition. This is performed using a plurality of content analysers, which are independently configured ML models in the above sense.

By way of example only, a content item could be a visual content item (comprising image data), where the performed task in this content is determining whether the visual content item contains a predetermined visual structure element (the predetermined content condition in this context). However, it is noted that the invention is not limited to visual analysis and can be applied to other forms of content.

The principles underlying the combinatorial decision making process, as outlined above, are particularly applicable in the context of fine-grained analysis tasks, where the ML content analysers are making individual decisions about whether or not a particular content condition is satisfied by a content item based on subtle characteristics of its content; and even more so when the range of possible decisions available those content analysers might have arrived at is large. This is further exemplified below.

One aspect of the present invention provides a computer-implemented method of processing a content item to extract information from the content item, the method comprising the following steps: receiving the content item at a processing stage; and determining whether the content item satisfies a predetermined content condition, by i) providing content of the content item to a plurality of content analysers, each of which applies machine learning content analysis thereto, in order to make an independent determination of whether that predetermined content condition is satisfied, and provides a confidence score for that independent determination, and ii) making an overall determination of whether the content item satisfies that predetermined content condition based on the confidence scores provided by the content analysers for their respective independent determinations.

In this manner, the method is able to arrive at an analysis result for certain items of content, with greater confidence than any one of the ML content analysers can achieve individually. In other words, the invention allows content items to be analysed with greater confidence overall, using a set of imperfect ML content analysers. This constitutes a significant improvement in machine learning computer technology, as it allows content analysis to be performed, for example, using existing ML content analysers, with greater confidence than any of those existing content analysers are currently able to achieve. That is to say, the combinatorial approach of the invention can be applied with existing content analysers to improve their performance as a whole, without having to improve the performance of any of the classifiers individually.

This can be implemented in embodiments of the invention using simple yet highly effective conditional logic applied to the confidence values both individually and in combination, wherein an overall determination is made that the predetermined content condition is satisfied if a combined confidence condition is satisfied by two or more of the confidence scores in combination and the content analysers providing those scores each make an independent determination that the predetermined content condition is satisfied, or an individual confidence condition is satisfied by one of the two or more confidence scores individually and at least the content analyser providing that confidence score makes an independent determination that the predetermined content condition is satisfied. For example, the combined condition may be that each of the two or more confidence scores exceeds a lower threshold (which can be the same or different for each confidence score), and the individual confidence condition may be that the confidence score exceeds a higher threshold; that is, a threshold higher than (each of) the lower threshold(s). Such confidence thresholds are referred to as trigger thresholds in the description below.

Preferably the invention is implemented as part of hierarchical classification architecture, in which different levels of content analysis are selectively applied to content items in order to arrive at a final result (from coarser analysis further up the hierarchy to more fine-grained analysis further down). This can be based on conditional logic applied at different levels of the hierarchy. For example, an initial coarse analysis can be applied to content items at the highest level of the hierarchy. At each of the level(s) below the highest level, additional analysis is selectively applied to the content items in dependence on the results of the analysis at the level above it (based on conditional logic applied thereto), wherein that additional analysis is more fine-grained than the analysis applied at the level above it. This is further exemplified below.

The combinatorial decision making approach can be implemented at any level of the hierarchy, but for the reasons noted above, has particular benefits when applied to the more fine-grained analysis applied at lower level(s) of the hierarchy, at which more fine-grained analysis is applied and where the decisions turn on subtle variations in the content. This is further exemplified later.

The hierarchy of analysis can be conveniently embodied in a configuration file, according to which the hierarchical analysis is carried out. As is known in the art, a configuration (config) file is a file, within a computer-implemented file system, that defines settings for a configurable computer program. In this context, a configurable program is provided whose primary functions are (i) coordinating the independent analyses performed by the independent ML content analysers, and (ii) combining the results of those analyses. One or (preferably) both of these aspects are configurable according to the config file. These functions are performed in a hierarchical manner, according to a hierarchy of content analysis settings that embody the hierarchy of analysis.

A particular benefit of this novel use of a configuration file is deskilling. For a programmer without specialist ML knowledge, it provides a convenient and highly customisable mechanism for defining the ambit of a complex ML analysis task, as further exemplified below.

In embodiments, an overall determination may be made that the predetermined content condition is satisfied if a combined confidence condition is satisfied by two or more of the confidence scores in combination, or an individual confidence condition is satisfied by one of the two or more confidence scores individually.

The combined confidence condition may be that each of the two or more confidence scores exceeds a lower threshold, and the individual confidence condition is that the confidence score exceeds a higher threshold.

The content item may be a visual content item and the predetermined content condition may be that the content item contains a predetermined visual structure element, wherein the machine learning content analysis applied by each of the content analysers comprises image recognition applied to image data of the content item, so as to make an independent determination of whether that predetermined visual structure element is present.

The method may comprise accessing a configuration file and performing the determining step in dependence thereon.

The configuration file may define the confidence conditions.

The configuration file defines the predetermined content condition, and the method comprises selecting the plurality of content analysers for making the said independent analyses based on the definition of the content condition in the configuration file.

The visual content item may include additional content other than image data, and the method may comprise classifying the additional content using at least one content analyser, wherein the overall determination is also based on the results thereof.

The additional content may be classified using text classification.

The method may comprise using at least one higher-level content analyser to determine that the content item belongs to a predetermined content category, the predetermined content condition being one of multiple content conditions associated with that content category, wherein the content category is defined such that any content item that satisfies any one of the associated content conditions belongs to that content category, wherein the determining step is performed in response to determining that the content item contains belongs to that content category.

Each of the content analysers may make an independent determination of whether each of the associated content conditions is satisfied.

The content category may correspond to a category of visual structure and each of the content conditions may correspond to a different visual structure element in that category of visual structure.

The configuration file may comprise content analysis settings in a defined hierarchy, and the method may comprise: selecting the at least one higher-level content analyser based on a first of the content analysis settings; and in response to determining that the content item belongs to the predetermined content category, selecting the plurality of content analysers for making the said independent analyses based on a second content analysis setting, which is a child of the first content analysis setting within the defined hierarchy.

The machine learning content analysis applied by each of the content analysers may comprise text analysis.

The output tree may be displayed as a graphical tree on a display of a computer device.

Further or alternatively, the output tree may be stored in association with the content item. For example, the output tree may be stored as augmentation data of the content item in a content database.

Another aspect of the invention provides a computer-implemented method of analysing content items in a content analysing system having a plurality of content analysers, the method comprising: receiving a content item to be analysed; accessing a configuration file, which comprises content analysis settings in a defined hierarchy; selecting at least a first of the content analysers based on a first set of the content analysis settings; using the selected first content analyser to analyse the content item; and if the results of the analysis using the first content analyser satisfy a predetermined condition, selecting a second set of one or more of the content analysers based on a second set of the content analysis settings, which is a child of the first set of content analysis settings within the defined hierarchy, and using the selected second set of content analysers to analyse the content item.

In embodiments, the predetermined condition may be defined in the configuration file.

The results of each analysis may be filtered according to a filtering condition defined in the configuration file, to filter-out results that do not meet the filtering condition. The filtering condition may be that each result having a confidence score below a filter threshold is filtered out.

The content analysers may be content classifiers, and the analyses may be performed in order to classify the content item.

The results of the analysis by the first content analyser may comprise a first set of classification results for a first set of content classes, and the results of the analysis by the second set of content analysers may comprise a second set of classification results for a second set of content classes.

The predetermined condition may be a trigger condition associated with a first content class of the first set of content classes in the configuration file, the second set of content analysers being used to analyse the content item if the classification result for the first content class satisfies the trigger condition associated with the first confidence class.

The trigger condition may be associated, in the configuration file, with the first content class and with the second set of content analysers.

The classification result for the first content class may be stored in an output tree, wherein if the trigger condition is satisfied by the confidence score for the first content class such that the second set of content analysers is to analyse the content item, at least one classification result of the second set of classification results is stored in the output tree, as a child of the classification result for the first content class.

The method may comprise filtering the first set of classification results for storage in the output tree based on a first set of filtering settings associated with the first content analyser in the output file, wherein filtered-out classification results are not stored in the output tree.

The method may comprise filtering the second set of classification results for storage in the output tree based on one or more second sets of filtering settings associated with the second set of content analysers, wherein filtered-out classification results are not stored in the output tree.

The classification results may comprise confidence scores.

Another aspect of the invention provides a computer-implemented method of recognizing visual structure in a visual content item, the method comprising the following steps: receiving the visual content item at a processing stage; and determining whether the visual content item contains a predetermined visual structure element, by i) providing image data of the visual content item to a plurality of image recognition components, each of which applies image recognition thereto, in order to make an independent determination of whether that predetermined visual structure element is present, and provides a confidence score for that independent determination, and ii) making an overall determination of whether the visual content item contains that predetermined visual structure element based on the confidence scores provided by the image recognition components for their respective independent determinations.

Another aspect of the invention provides a computer-implemented method of classifying content items in a content classification system having a plurality of content classifiers, the method comprising: receiving a content item to be classified; accessing a configuration file, which comprises classification settings in a defined hierarchy; selecting a first set of one or more of the content classifiers based on a first of the classification settings; using the selected first set of content classifiers to classify the content item; if the results of the classification using the first set of content classifiers satisfy a predetermined condition, selecting a second set of one or more of the content classifiers based on a second of the classification settings, which is a child of the first set of classification settings within the defined hierarchy, and using the selected second set of content classifiers to classify the content item.

Another aspect of the invention provides a content processing system comprising: an input configured to receive content items for processing; and a processing stage configured to apply any of the said methods to a received content item.

Another aspect of the invention provides computer program comprising executable code stored on a computer-readable storage medium and configured when executed to implement any of the said methods.

BRIEF DESCRIPTION OF FIGURES

For a better understanding of the invention, and to show how embodiments of the same may be carried into effect, reference is made by way of example only to the following figures in which:

FIGS. 4A and 4B show an example of a configuration file and a process flow defined by the configuration file respectively;

DETAILED DESCRIPTION

Figure 1:
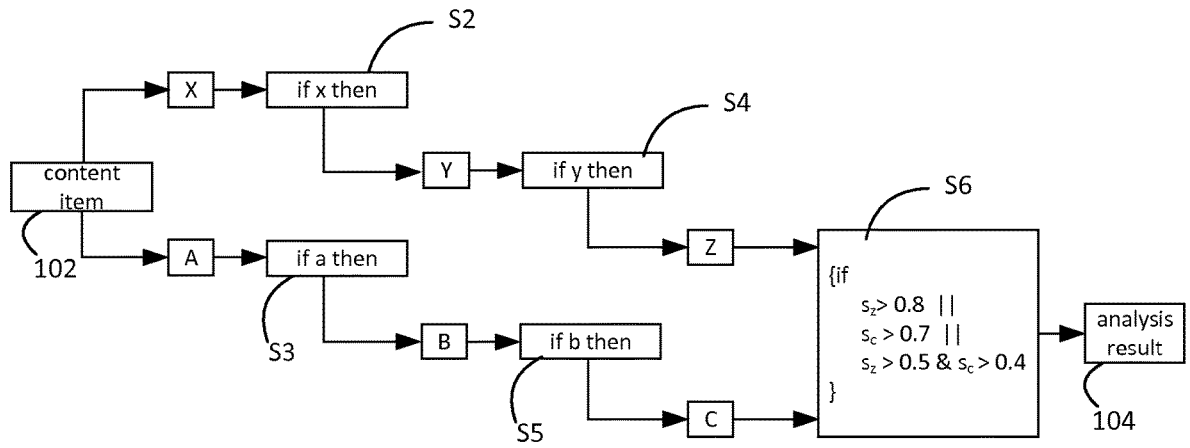
FIG. 1 shows a function block diagram representing functionality implemented in a content processing system, in a first example.

Embodiments of the invention will now be described to further demonstrate certain practical applications of the combinatorial decision making approach set out above, in which a content item is processed by multiple independently configured ML content analysers, each of which makes an independent determination as to whether that content item contains a particular visual structure element or satisfies some other predetermined content condition (e.g. in relation to text or other some other form non-visual content), and provides a confidence for that independent determination. An overall determination of whether the content item satisfies that predetermined content condition is made based on the confidence scores.

The confidence scores are considered both individually and in combination, such that an overall determination is made that the predetermined content condition is satisfied in either one of the following cases (for example):

1. At least one of the content analysers individually determines that the content condition is satisfied, with at least a higher level of confidence (confidence score above a higher trigger threshold); or
2. Two or more of the content analysers determine that the content condition is satisfied, each with at least a lower level of confidence (each confidence score above a lower trigger threshold, which can be the same or different for the different content analysers, but which is any event lower than the higher level of confidence).

The requirement that a confidence score individual exceeds a trigger threshold, or that multiple confidence thresholds each exceed the same or different trigger thresholds, are examples of what are referred to herein as individual and combined confidence conditions respectively. Confidence conditions are conditions on the level of confidence with which a determination is made as to whether a content item satisfies a particular content condition (such as the determination of whether it belongs to a particular content class).

A confidence condition which, when met, triggers a further round of content analysis (e.g. classification) is referred to as a trigger condition. A confidence condition may also be used as a filtering condition, to filter classification results (but not trigger further analysis as such) as described later.

A valid confidence score in the context of this disclosure means a meaningful level of confidence with which a content analyser had made a determination as to whether or not a particular content condition is satisfied. For an ML classifier, this decision is a decision about whether a content item belongs to a particular class, which can be a soft (e.g. probabilistic) or hard (deterministic classification). For example, a probabilistic classifier may classify an input with respect to a set of classes by outputting a probability distribution for the input over the set of classes, denoting for each class a probability that the input belongs to that class.

The confidence scores determined for different classes could for example be probabilities determined or estimated for those classes, by a probabilistic classifier(s). In this context, a higher class probability denotes a higher confidence that a content item belongs to the corresponding class. For example, the confidence scores could be a softmax output (each component of which broadly equates to the probability of a single class, and constitutes a confidence score for that class) or a parameters of sigmoidal distribution for each class (where multiple classes may coexist) etc.

It is noted however that this does not constitute an exhaustive definition of a confidence score and, as will be appreciated, there are different ways of defining valid confidence scores in different contexts.

As described below, a config file is provided which defines a process flow for performing hierarchical classification. The config can handle any type of confidence score as it simply requires a class label and a score to be defined in relation to a particular classification task, however that score is defined, as described later. That is, the config file allows different classifiers that provide different types of confidence score to be coordinated in a logical manner.

As noted, the combinatorial decision making has particularly applicability to fine-grained analysis tasks with a relatively large range of possible outcomes. That is to say, if two or more ML content analysers have the freedom to select from a large range of possible decisions about a content item, and the selections they make turn on only subtle variations in the content, then the fact that those two or more content analysers have independently arrived at mutually corroborating results significantly increases the overall confidence that can be attributed to those results as a whole, even if those analysers are not particularly confident in their individual decisions.

For example, in the embodiments of the invention described below, the content analysers are content classifiers, each of which classifies the content item in relation to a respective set of content classes. Where the sets of classes are large (e.g. corresponding to a range of models of a particular make of car, or a range of types or variants of a particular make and model of car), and the outcome of the classification varies significantly across the range of classes in dependence on only subtle variations in the content being classified (e.g. because the visual distinction between certain models, or between different types of variants of the same make and model are subtle), then when two classifiers arrive at mutually corroborating classification results (e.g. same model, or same make or variant), albeit with somewhat low levels of confidence individually, an overall classification can be assigned with a significantly higher level of overall confidence.

Preferably the invention is implemented as part of hierarchical classification architecture, in which different levels of content analysis are selectively applied to content items in order to arrive at a final result. In this context, higher-level (coarser) ML analysis may applied to each content item initially, to analyse it in relation to one or more broader content categories, having or each having multiple associated content conditions. By way of example, a content category could correspond to a category of visual structure containing multiple visual structure elements (corresponding to the content conditions). Lower-level (more fine-grained) analysis is then selectively applied depending on the results of the higher-level analysis. That is, coarse ML content analysis is applied initially to a content item at the highest level of the hierarchy, and at each of the one or more levels of the hierarchy below the highest level, content analysis is selectively applied to the content item in dependence on the content analysis applied at the level above it, which is more fine-grained than the content analysis applied at the level above it.

The combinatorial decision making approach can be implemented at any level of the hierarchy, however it is particularly effective when applied at lower level(s) of the hierarchy in respect of more fine-grained analysis tasks, as exemplified below.

This is partly because, by and large, there is less readily available training data that is relevant to more fine-grained analysis tasks. For example, in image recognition, there exists a huge volume of relevant training data for training an image recognition component to detect cars, but a much smaller volume of relevant training data available to train an image recognition component to distinguish between, say, different models of a particular make of car, or different types and variants of a particular make and model of car. Another factor is that, when performing a fine-grained image task to determine whether a content item satisfies a very specific content condition (e.g. contains a specific model, or specific type and/or variant of a particular make and model of car), the distinctions on which this determination turns can be very subtle (e.g. the visual variations between certain models, or between different types and variants of a particular make and model of car may be very subtle), and therefore inherently hard to detect.

This is compounded further when there are a large number of different and highly-specific content conditions that might be satisfied by a content item, and which on the face of it all appear very similar (e.g. there may be a relatively large number of similar models, or a large number different possible types and variants of a particular make and model of car, having only subtle visual distinctions). It is in this context that the combinatorial decision making approach has particular benefits: if two or more ML content analysis are able to independently corroborate each other's results in relation to a difficult fine-grained content analysis task (such as detecting a specific make and variant)—even if their own results have been provided with relatively low confidence levels individually—the overall confidence that can be attributed to those results is much higher than their individual confidence levels. This is particular true when there are a large number of possible results those analysers could have arrived at, and their decision in this respect turns on subtle distinctions (e.g. if there a large number of possible makes and variants that the analyser is configured to select between, which are all visually similar).

By applying appropriate conditional logic at different levels of a multi-level content analysis hierarchy, a classification architecture can be provided that is able to perform highly-specific content analysis tasks, in a robust and computationally efficient manner. The saving in terms of computational resources that stems from this computational efficiency is particularly significant when the invention is applied to a relatively large corpus of content items. For example, the invention could be implemented in a search tool, which can be used to quickly search a disparate collection of content items to find any of the content items that satisfy a highly-specific content condition. For example, the task could be to locate a visual content item that contains a car of a specific make, model, type and variant. This is a complex image recognition task, as the variations between different types and variants of vehicle of the same make and model can be extremely subtle. This is computed further by the fact that any images of the car may be distorted and/or partially occluded. Using the hierarchical approach, however, this task can be implemented in a robust an efficient manner, by breaking the problem up into smaller problems that are easier to solve.

Some further examples will now be described to further illustrate the underlying concepts.

FIG. 1 shows a generic example in which combinational decision making is implemented within a content analysis hierarchy, which runs from left (top of the hierarchy) to right (bottom of the hierarchy).

In this example, the ultimate aim is to determine whether a content item 102 belongs to a specified, fine-grained content class, within a classification hierarchy. For example, the class could correspond to a specified make and model of car. The task can be broken down into constituent components, by first determining whether a the content item 102 belongs to a car class (corresponding to classes x, a below), i.e. whether it contains a car at all; only it does belong to the car class, then the next determination is whether it belongs to a more fine-grained class corresponding to the desired model (y, b), i.e. determining whether the car is the desired make; and only if it does belong to the desired make class, then the next determination is whether it belongs to a yet more fine grained class corresponding to the desired make (z, c).

Within the classification hierarchy, the desired make class is a child of the desired model class (its parent), which in turn in a child of the car class. A classification in relation to a child class may be referred to as a sub-classification with respect to the parent classification.

Figure 3:
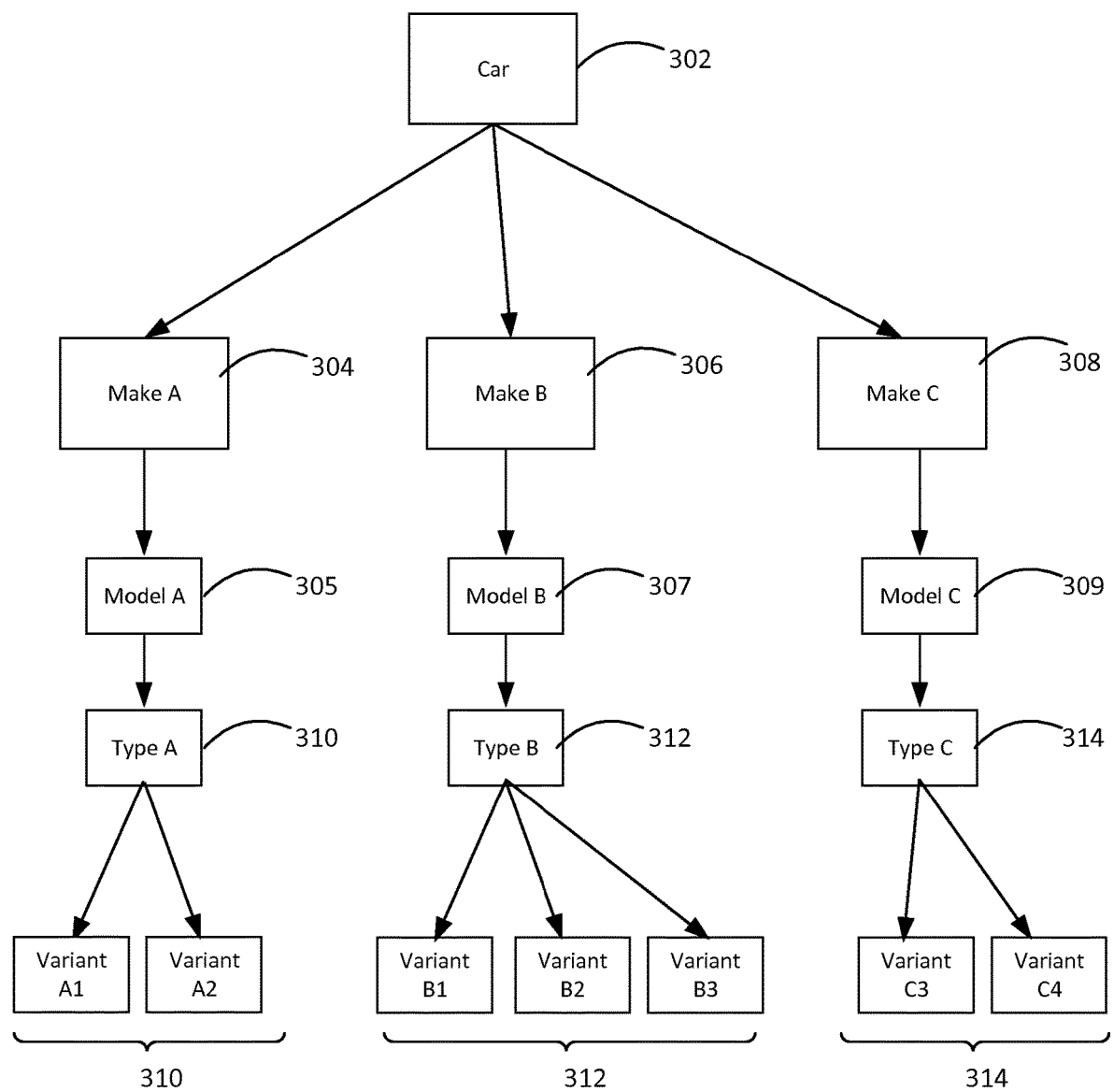
FIG. 3 shows an example content classification hierarchy.

FIG. 3 shows an example of a three-level content classification hierarchy, with a car class 302 at the top of the hierarchy for content items that contain images of or otherwise relate to cars. Three child classes 304, 306 and 308 of the car class 302 are shown, corresponding to different makes of car (e.g. Porsche, Volkswagen, Ford etc.). Each of these model classes 304, 306 and 308 is shown to have, in turn, its own child class (305, 307 and 309 respectively), corresponding to a particular model of that make. Note that, although only one model class is shown for each make class, each make class could be associated with multiple model classes corresponding to different models. In turn, the model classes 305, 307 and 309 are shown to have respective children, which are type classes 310, 312, 314, corresponding to a particular type (e.g. number) of that model. The type classes 310, 311 and 314 are themselves shown to have respective sets of "variant" classes, labelled 320, 322 and 324 respectively, each corresponding to a different variant of that model type. As will be appreciated, this is just one example, and there are a number of classification problems there a classification hierarchy can be defined to match a semantic hierarchy inherent in the type of content being classified.

Returning to FIG. 1, two duplicate chains (branches) of classification are applied to the content item 102, each of which independently selectively moves down the classification hierarchy.

Content of the content item 102 is separately provided to independent ML content classifiers labelled X and A, at the highest level of the hierarchy (top-level classifiers). The top-level classifiers X and A independently classify that content in relation to respective sets of content classes, denoted $S_X$ and $S_A$ respectively (not shown in the figures). These initial classification constitute the respective starting points for the two independent chains of hierarchical classification, which are then combined upon reaching the end of the hierarchy assuming all of the necessary conditions are satisfied.

Within the first chain, if classifier X determines that the content item 102 belongs to a specified one of the content classes $x \in S_X$ (S2) at a first (highest) level of the hierarchy, then in response, classifier Y at the next level down from X is caused to classify the content item 102 in relation to a set of content classes $S_Y$, which are children of x within the hierarchy at the next level down (second level). In this hierarchical context, classifier x corresponds to a predetermined content category, and the set of content classes $S_Y$ over which Y performs its classification correspond to different content conditions associated with its parent content category. As a consequence of the hierarchical relationship between x and $S_Y$, if a content item belongs to any one of the content classes in the set $S_Y$ over which Y performs its classification, then that content item must also belong to class x.

The chain of classification proceeds further down the hierarchy in exactly the same way a: if classifier Y determines that the content item 102 belongs to a specified one of the content classes $y \in S_Y$ (S4), then in response classifier Z is caused to classify the content item 102 in relation to a set of content classes $S_Z$ at the next level down from y (third level of the hierarchy), $S_Z$ being children of class y within the hierarchy.

Within the second chain, an equivalent series of classifications takes place independently: at the first level, classifier A classifies the content item 102 in relation to $S_A$ to determine whether it belongs to specified class $a \in S_A$ (equivalent to x); if so (S3) then classifier B at the second level determined classifies the content item 102 in relation to $S_B$ (children of class a), to determine whether it belongs to specified class $b \in S_B$ (equivalent to y); if so (S5), then classifier C at the third level classifies the content item 102 in relation to $S_C$ (children of class b), to determine whether it belongs to specified class $c \in S_C$ (equivalent to z).

By way of example, in an image classification context:
x and a could correspond to "car";
$S_Y$ and $S_B$ could correspond to different models of car, with y and b both corresponding the specified model (note the sets $S_Y$ and $S_B$ do not need to be identical— they could for example correspond to different but overlapping subsets of possible model); and
$S_Z$ and $S_C$ could correspond to different makes of the specified model of car y/b, with z and c both corresponding to the specified make.

The results from the two classification chains are then combined (S6) as follows—this is the point at which the combinatorial decision making is implemented in this example. Classifies Z and C each provide a respective confidence score—$s_z$ and $s_c$ respectively—for their classifications of the content item in relation to classes z and c respectively. An overall determination is made that the content item 102 does satisfy a content condition corresponding to both z and c (e.g. that it does contain an image of or otherwise relate to the specified make and model of car) at S6 if (and only if) any one of the following trigger conditions is satisfied:

$s_z$ exceeds a first threshold (e.g. 0.8) (trigger threshold); OR $s_z$ exceeds a second threshold (e.g. 0.7); OR $s_z$ exceeds a third threshold (e.g. 0.5) AND $s_c$ exceeds a fourth threshold (e.g. 0.4)

If so, then a positive result 104 is outputted to indicate that the content item does satisfy the desired condition.

If the necessary conditions at S2-S6 are not satisfied then, in this example, the process terminates in this example. For example, if classifier Y is not sufficiently confident that classifier Y belongs to class y, then in this example the process terminates at that point. When implemented in a search tool, this would generally be the point at which the method moves onto the next content item to be considered (although where multiple branches of classification are performed, this may not be until all of the branches have terminated, in order to allow the process to generate a complete tree of results—see below). It is noted however that this is just one example. For example, combinatorial decision making could also be applied to the classification results of classifiers Y and B, in the same way as the results from classifiers Z and C are combined.

As described below, the hierarchy can be configured in a config file, according to which the process is performed.

The level of detail provided in the config file can be varied as desired. For example it may just define the hierarchy without specifying the classifier selection and confidence thresholds. To enable this, the content processing system is configured with built-in defaults for each classifier, set at a reasonable level.

However the defaults can be overridden at each level within the config file, and for each user, to ensure that the correct classifiers are used and the performance is tuned for the user's needs.

To illustrate this, a snippet of an example config file 400 is shown in FIG. 4A.

Figure 4B:
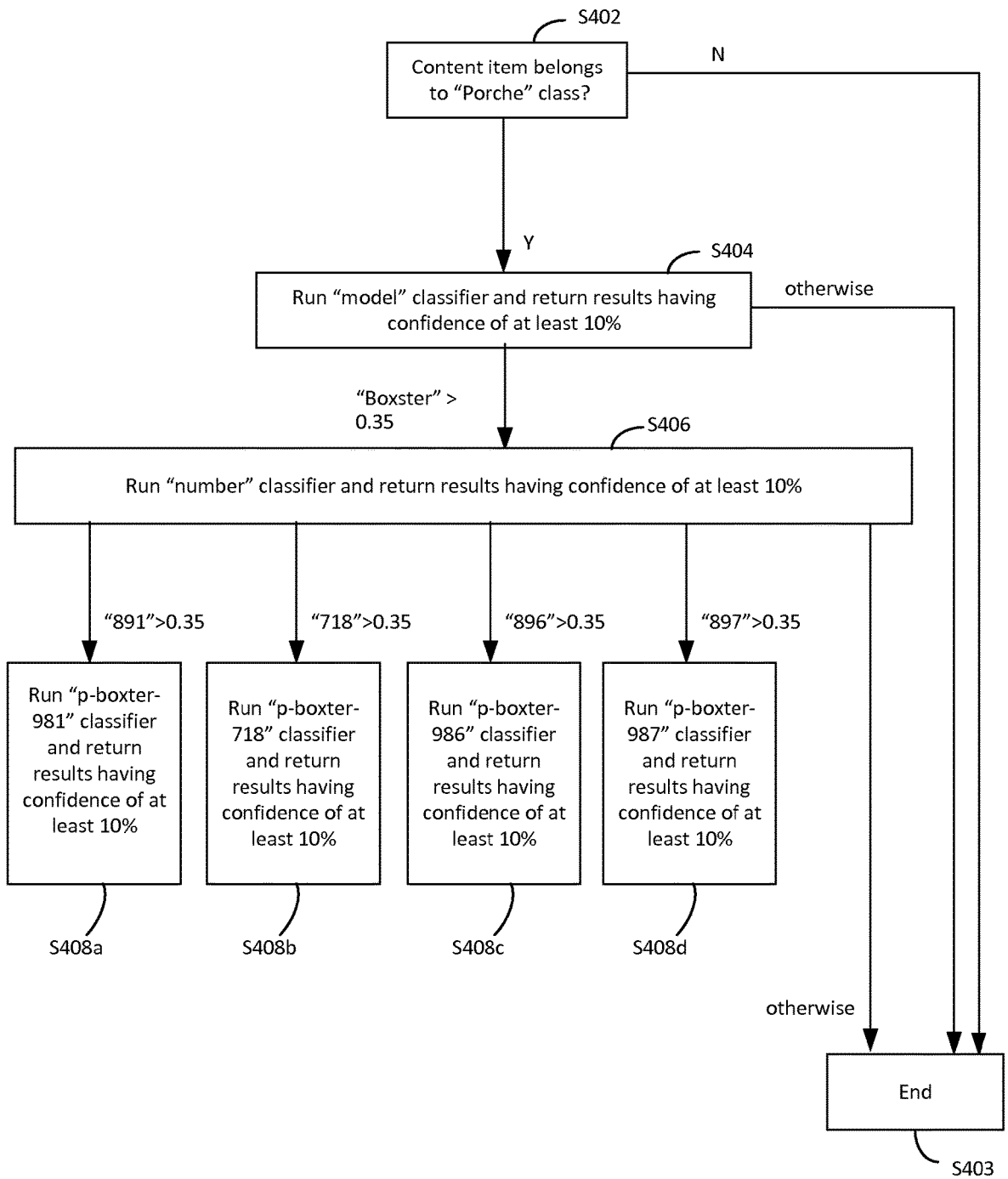

As can be seen, the config file 400 defines a hierarchy of content analysis settings (content classification settings) in which hierarchical associations between parent and child settings have associated conditional logic. This in turn defines a hierarchical process flow which, when applied to a content item, selectively builds a tree of classification results (in electronic storage 506, FIG. 5—see below) according to the hierarchy and conditional logic defined in the config file 400. A flow chart for the process is shown in FIG. 4B and will now be described with reference thereto.

This example assumes the content item has been classified as belonging to a "Porsche" class (S40402) with sufficient confidence, and the steps described below (S404 onwards) are performed in response to that positive determination. In the absence of such a determination, the process terminates for the content item (S3). This classification and associated conditional logic are not defined in the config file of FIG. 4A but could in general be defined in a config file in a manner that will become apparent. From this point, the defined process flow proceeds as follows.

Step S404 is defined by a first set of classification settings 402 embedded in the config file 400. In accordance with those settings 402, a "model" classifier ('porsche-model') is run on the content item, and all results having a confidence score of at least 0.1 are returned ('confidence': 0.1). That is, the results generated by the classifier are filtered according to the "'confidence': 0.1" setting (filtering setting 403, defining one or more filtering conditions), such that classification results are only retained if they have confidence scores of at least 0.1; others are filtered-out (discarded). Here, 0.1 is a filter threshold set by the filtering setting 403 for the model classifier. This corresponds to a filtering condition, namely that results with confidence below this filter threshold are filtered out.

If there is a Boxster at with at least 0.35 confidence indicated within the filtered results ('trigger': {'confidence': 0.35, 'key': "Boxster"}), then the process proceeds to step S406; otherwise the process terminates (S3). This condition is defined by conditional logic 404 (trigger settings) in the config file 400, that is associated with the first set of classification settings 402. Here, 0.35 is a trigger threshold associated with the "Boxter" class, as defined by trigger settings 404. This corresponds to a trigger condition, namely that the confidence score for the "Boxter" class must reach the trigger threshold in order to trigger the next round of classification under the "Boxter" class.

Step S406 is defined by a second set of classification settings 406 within the config file 400. Within the defined hierarchy, the second set of classification settings 406 is a child of the first set of classification settings 402, with that association being defined by the trigger settings 404. At step S406, a "number" classifier ('p-boxster-number') is run on the content item, and each classification result having a confidence of at least 0.1 is returned (filter threshold for the number classifier, as set by filter setting 407 associated with that classifier), based on the same filtering principles as described above.

In this case there are multiple possible classification outputs (labels; '981', '718', '986' and '987') that trigger further level of classifications, in the event that the conditions defined by trigger settings 410a, 410b, 410c and 410d respectively are met. As can be seen in FIG. 4A, in this example, if the confidence score for any one of those labels is at least 0.35 (though this threshold is configurable for each individually, as can be seen), then in response a specific variant classifier corresponding to that label ('p-boxster-981', 'p-boxster-718', 'p-boxster-986' and 'p-boxster-987' respectively) is run in response, and the results with a confidence of at least 0.1 are returned—at steps S408a, S408b, S408c and S408d (FIG. 4B) respectively, as defined by third sets of classification settings 412a, 412b, 412c and 412d respectively, each of which is a child of the second set of classification settings 406 within the defined hierarchy. Otherwise the process terminates (S403).

Note that references to termination in the above do not necessarily mean that the whole process terminates. In the case of branched classification, as in FIG. 1 and FIGS. 4A/4B (see below), this can be a termination of only the branch of classification in question, with other branches continuing in parallel.

A benefit of having configurable confidence thresholds throughout the hierarchy of the config file 400 is that it allows the system to be tuned depending on the precision of the models. For example it may be observed that that the p-boxster-number classifier always correctly classifies 981 but with a score between 0.28 and 0.4, while the 987 is always correct between 0.5 and 1. Decisions can then be made about whether to show all the branches of the tree (that is, include them in the final output—see below) or not by adjusting the reporting and trigger confidences, which can vary depending on the problem being addressed.

It is important to note the distinction between a filter threshold as set by filtering settings (set at 0.1 in the examples above) and a trigger threshold set by triggering settings (set at 0.35 in the examples above). Classification results that meet a filter threshold are retained as a consequence, but this will not trigger a further round of classification per se. Such results can be included in a final output file (see the description below that accompanies FIG. 7). A classification result having an associated trigger threshold defined in the config file will trigger a further round of classification if the applicable confidence score reaches the trigger threshold.

Figure 4C:
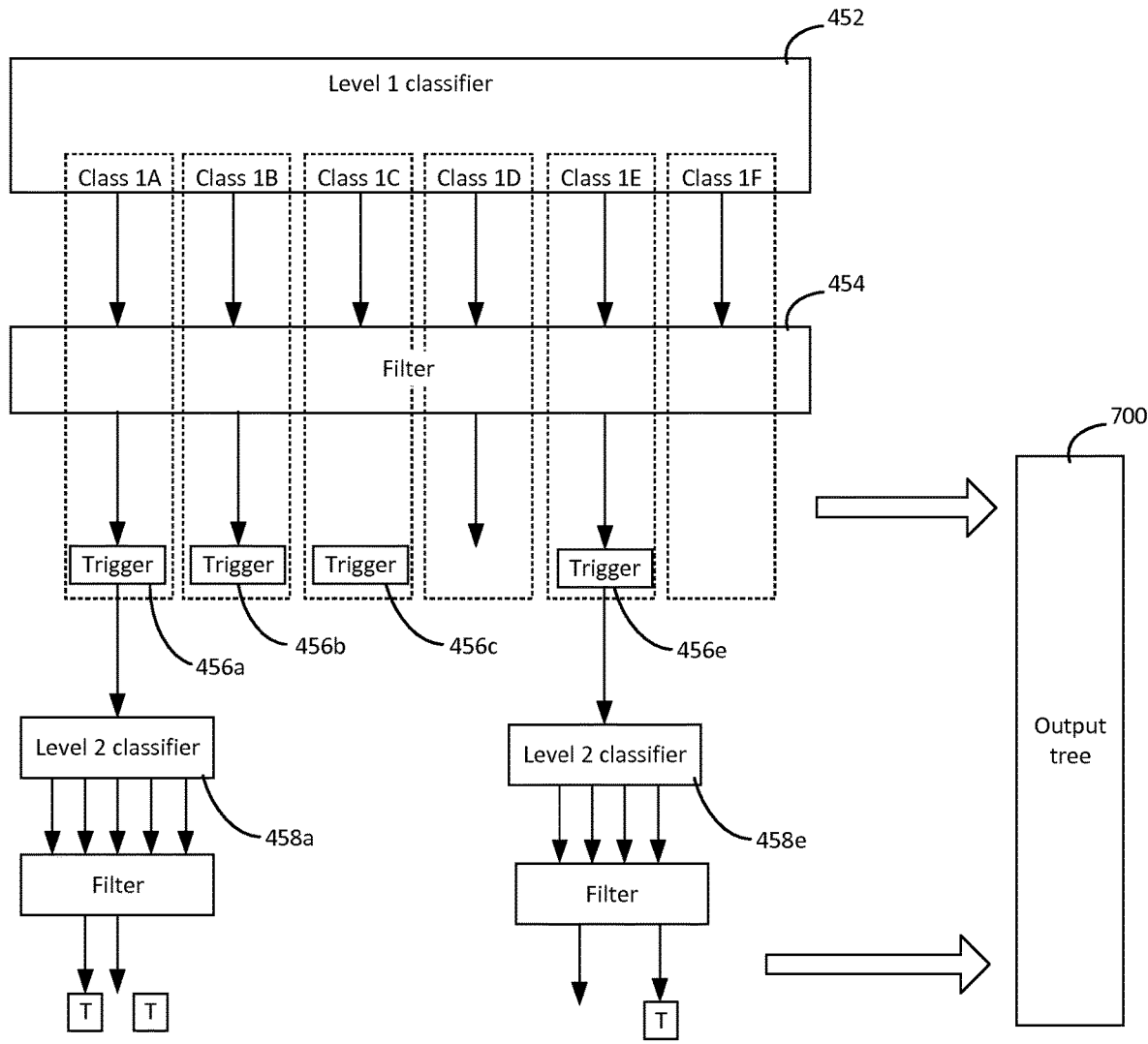
FIG. 4C is a schematic functional block diagram illustrating the principles of filtering and triggering by example.

This is further illustrated in FIG. 4C, which is schematic diagram indicating how successive filtering and triggering conditions are applied to generate a useful output file 700 (see also FIG. 7 and the description below), according to the settings in a config file.

A first classifier (level 1 classifier) classifies a content item in relation to six classes, 1A to 1F. As shown, trigger conditions 456a, 456b, 456c and 456e are associated with classes 1A, 1B, 1C and 1E respectively in the config file. No trigger conditions are associated with class 1D or 1F in this example.

However before the trigger conditions are tested, the results are filtered according to filtering settings 454 associated with the first classifier 452 in the config file, as described above. In this case, this leaves only the results for classes 1A, 1B, 1D and 1E. These are included in the output file 700, whereas the filtered-out results for classes 1C and 1F are not included.

The results for classes 1A, 1B and 1E have the potential to trigger further rounds of classification—but only if the associated trigger conditions 456a, 456c and 456e are met respectively. In this case, they are met for classes 1A and 1E, but not for class 1B. Hence only further rounds of classification, by second classifiers 458a and 458e (level 2 classifiers) respectively, are triggered in response.

Thereafter, those same principles of filtering and triggering are applied to the results generated by the level two classifiers, as illustrated.

Another feature of a config file which is not exploited in the examples of FIGS. 4A and 4B is the ability to define multiple chains of parallel classification, as in FIG. 1. A more detailed example of this will now be described with reference to FIG. 2.

Figure 2:
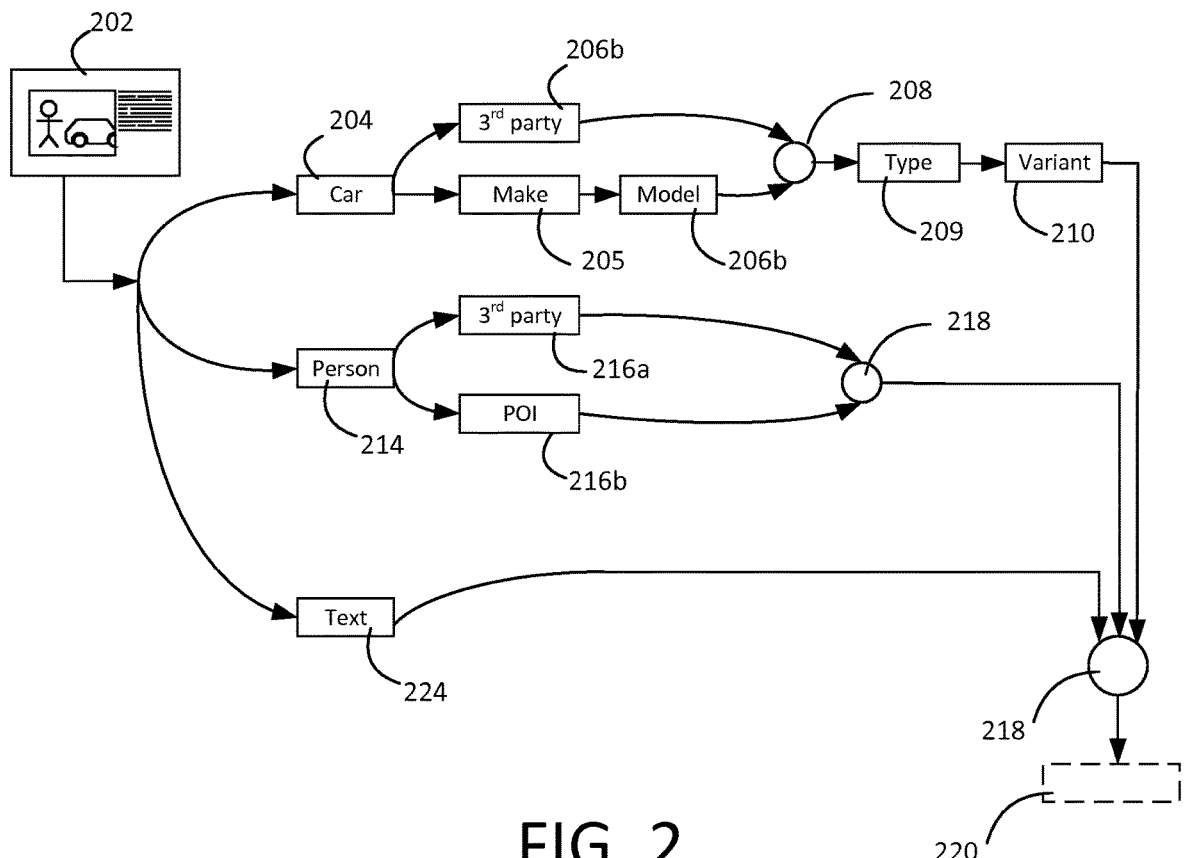
FIG. 2 shows a function block diagram representing functionality implemented in a content processing system, in a second example.

In FIG. 2, a content item 202 to be classified is shown to comprise a combination of text and image data. The task in this case is a highly specific task of determining whether the image contains both a specific make, model, type and variant of car (target variant), similar to the example of FIGS. 4A and 4B and additionally a specific individual (target person) and expresses a positive sentiment.

This involves three chains of classification (car, person, sentiment), with further sub-chains (sub-branches) of independent classification within each of those chains.

Within the car classification chain, a "car" classifier 204 is run on image data of the content item 202. If the image is determined to belong to a car class with a confidence score above a trigger threshold, then in response a determination is made as to the make and model of car.

In this example, this involves two parallel, independent sub-chains of model classification, by to independent "model" classifiers 206a and 206b.

As described above, an overall determination is made that the car belongs to a particular model class if a confidence score provided by either one of those classifiers meets an individual confidence condition (e.g. exceeds a higher threshold), or if the confidence scores meets a combined confidence condition in combination (e.g. each exceeds a lower threshold). This conditional logic is applied at block 208. The different confidence conditions (e.g. higher and lower thresholds, and the way in which they are applied) can be the same or different for the different classifiers. Default thresholds are set, but which can be overridden by specifying different thresholds in the config file, as trigger settings. The multiple classifiers 206a and 206b can be identified in the config file. The individual and combined confidence conditions can also be defined in the config file, as appropriate triggering settings.

In this example, in the first of the sub-chains, a make classifier is run on the content item 202 before running the first model classifier 206b, as in FIGS. 4A and 4B. Again, this can be defined in the config file.

Provided at least one of the necessary conditions is met at clock 208, then "type" and "variant" classifiers 209, 210 are run in response, as in FIGS. 4A and 4B, but driven in this case by the combinatorial decision making of the parallel sub-chains whose results are coordinated at block 208. Although only one such classifier is shown in FIG. 2, there could be multiple classifiers that are run at this stage for different possible variants.

Within the person classification chain, a person classifier 214 is run initially on the image data. If it is determined that the image data contains a person with sufficient confidence, in response an attempt is made to identify that person. In this example, separate independent attempts are made by independent classifiers 216a, 216b. As above, if either of those classifiers 216a 216b recognizes the target person, and their individual confidence scores either satisfy a combined confidence condition, or one of those scores satisfies an individual confidence condition (applied at block 218), then an overall determination is made that the target person is present.

Within the text chain, a text classifier 244 configured to perform sentiment recognition is applied to the text of the content item.

At block 218, the results of the three classification chains are combined to provide a final result 220. In this case, the final result 220 indicates if all three of the following conditions are satisfied:

(i) the variant classifier 210 determines that the target variant is present with sufficient confidence,
(ii) an overall determination is made at block 218 that the target person is present, and
(iii) the text classifier 224 determines that the text expresses a positive sentiment with sufficient confidence.

This can be indicated by way of selective classification results included in the final result 220, selected via successive filtering and triggering stages, in order to convey not only a final conclusion, but also the mechanism by which this conclusion was made.

Although described in the context of finding a content item with a specific person and variant, the same techniques could be applied to find a content item containing one of a group of variants and/or one of a group of specific individuals. Again, this is all configurable in the config file.

In the example although, text and image are treated separately in the above. However, a benefit of this approach is that text and image classification (or indeed classification of any two or more data types) can be combined flexibly. For example, a set of triggering settings could be defined in the config file, which combine text and image classification results based on combined and individual confidence scores provided for text and image respectively.

Figure 5:
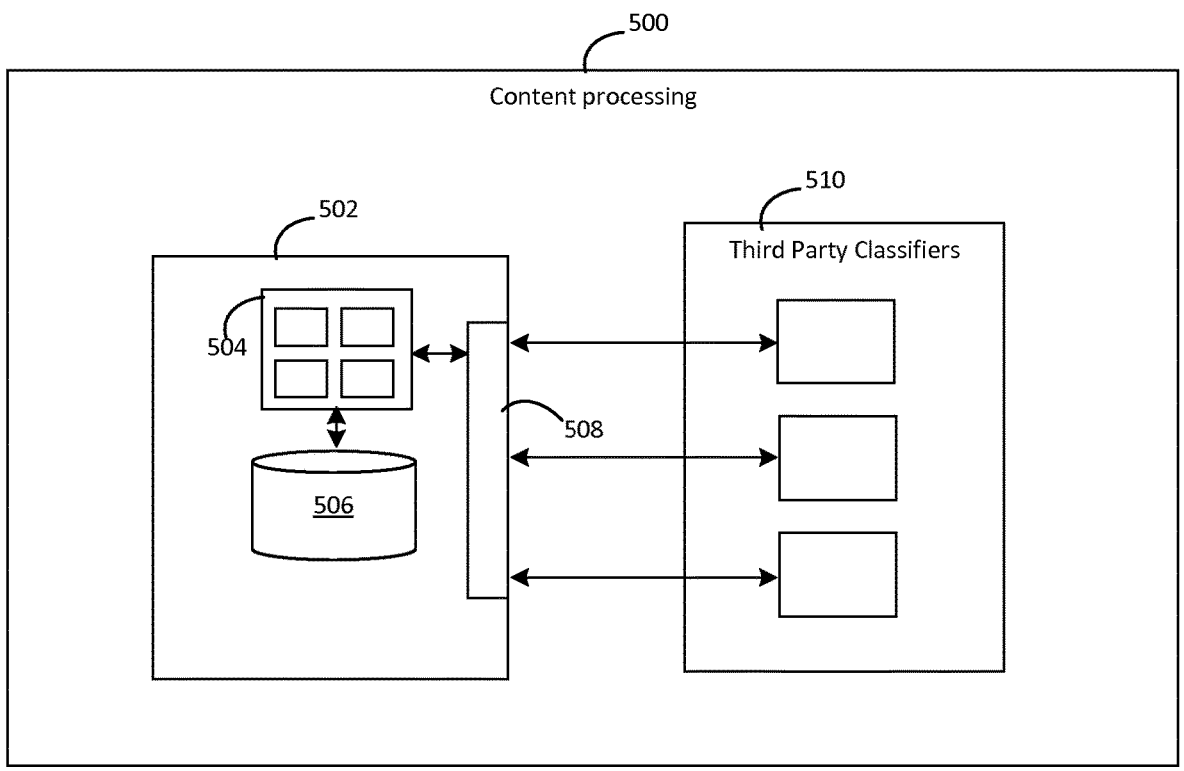
FIG. 5 shows a block diagram of a content processing system.

FIG. 5 shows a schematic block diagram of a content processing system 500 in which the content processing described above is implemented. The content processing system 500 is shown to comprise a content analysis platform 502, which in turn is a computer system shown to comprise a processing stage in the form of one or more processing units 504, such as CPUs and/or GPUs (and the like) and electronic storage 506 coupled to the processing units. The processing units execute computer programs, embodied as computer-readable instructions, in order to implement the functionality of the content analysis platform 502.

A key function of the content analysis platform 502 is coordinating the classification of content items by multiple classifiers, according to a config file received at the content analysis system. Those classifiers can be implemented within the content analysis platform 502 itself, but the content analysis platform 502 is also equipped with a network interface 508, via which it can instigate queries to "third-party" classifier 510, which are external to the content analysis platform 502. A benefit of this set up is that third-party classifiers can be used flexibly in combination with internal classifiers implemented within the content analysis platform 502 itself, to provide highly sophisticated content analysis. Moreover the use of config files allows this to be leveraged by non-experts.

Intermediate results from the different classifiers are stored in the electronic storage 506, in accordance with the config file. For example, in the example of FIGS. 4A/4B, results that meet the 0.1 confidence filter threshold for retention are stored in the electronic storage 506.

The functional blocks of FIGS. 1 and 2 and the steps of FIG. 4 represent, respectively, functionality and operations implemented within the content processing system 500, either by the content analysis platform 502 or by the third-party classifiers 510 under the control of the content analysis platform 502.

Figure 6:
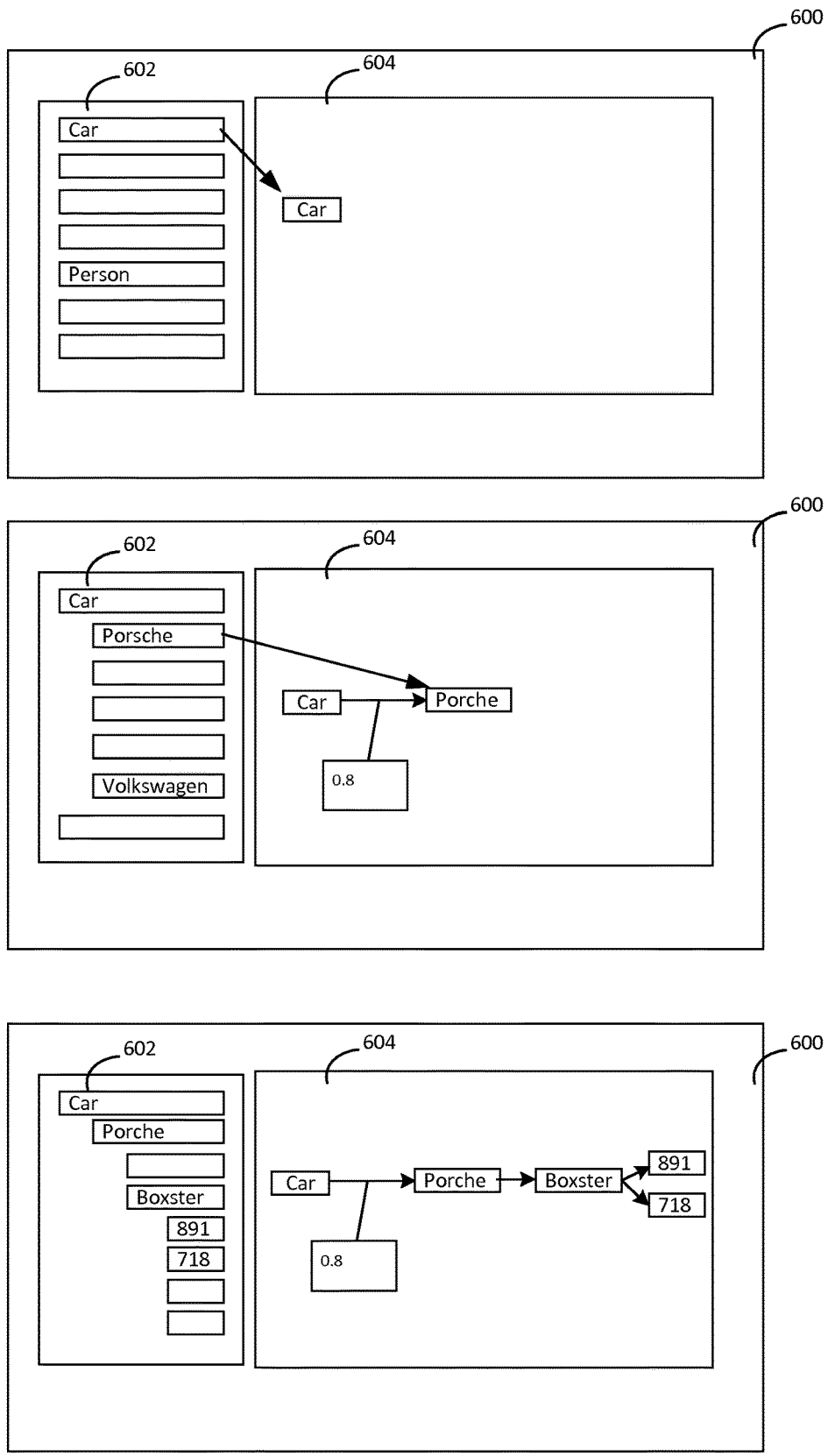
FIG. 6 shown an example of a graphical tool for building a configuration file.

FIG. 6 shown a schematic example of a user interface 600 (UI), as render on a user device (not shown). The user interface 600 provides a graphical tool for building a config file. A set of selectable options 602 corresponding to available classification settings is shown, which a user can select form in order to build a graphical representation 604 for a desired config file. As shown, high-level classification setting are provided initially, which can be expanded in order to access increasing low-level classification settings, and which the user can then add to the graphical representation 604 as desired. That is, the selectable options 602 are provided in a hierarchical list that reflects the hierarchical relationships of the underlying classification settings. For example, the UI may be configured so that the selectable options 602 can be dragged into the region of the UI in which the graphical representation 604 is created.

This provides an intuitive mechanism by which a user can define a classification hierarchy to be rendered as a config file. The hierarchical structure of a config file is conducive to this form of graphical tool.

This graphical tool is an optional extension. A config file can be created in other ways, for example using a simple text editor.

The final result (e.g. 104, 220) could be a simple binary indication of whether or not all of the specified criteria are met with sufficient confidence (for example).

However, as noted, richer information can also be captured in a final result, to provide a record of the individual outcomes at every stage of the hierarchical classification process. This can be embodied in an output file.

Preferably the final result is embodied in a hierarchical data structure (output tree) that reflects the hierarchy of classifications performed to arrive at the final result.

For example, the output from each classifier may be an output array, such as a JSON array. These output arrays are combined into an overall data structure (the final result), which is effectively a tree of results. An example of a final JSON output is included below as an annex to this description.

This can then be passed to a receiving system either for display directly (as a graphical tree of results, for example) or for augmenting the content item in a content database from in which it is held (its original source database). Depending on the config file, if the lower filtering threshold is not exceeded then results are not included in the output file. In the example included in the Annex below, it can be see that only Porsche is returned as car make, as all other makes have less than 0.01% confidence (the confidence for Porsche is 0.9999999999819368). At the Boxster number level 2 results are returned but only 718 is high enough to trigger the next level. This example also has a person detected.

Figure 7:
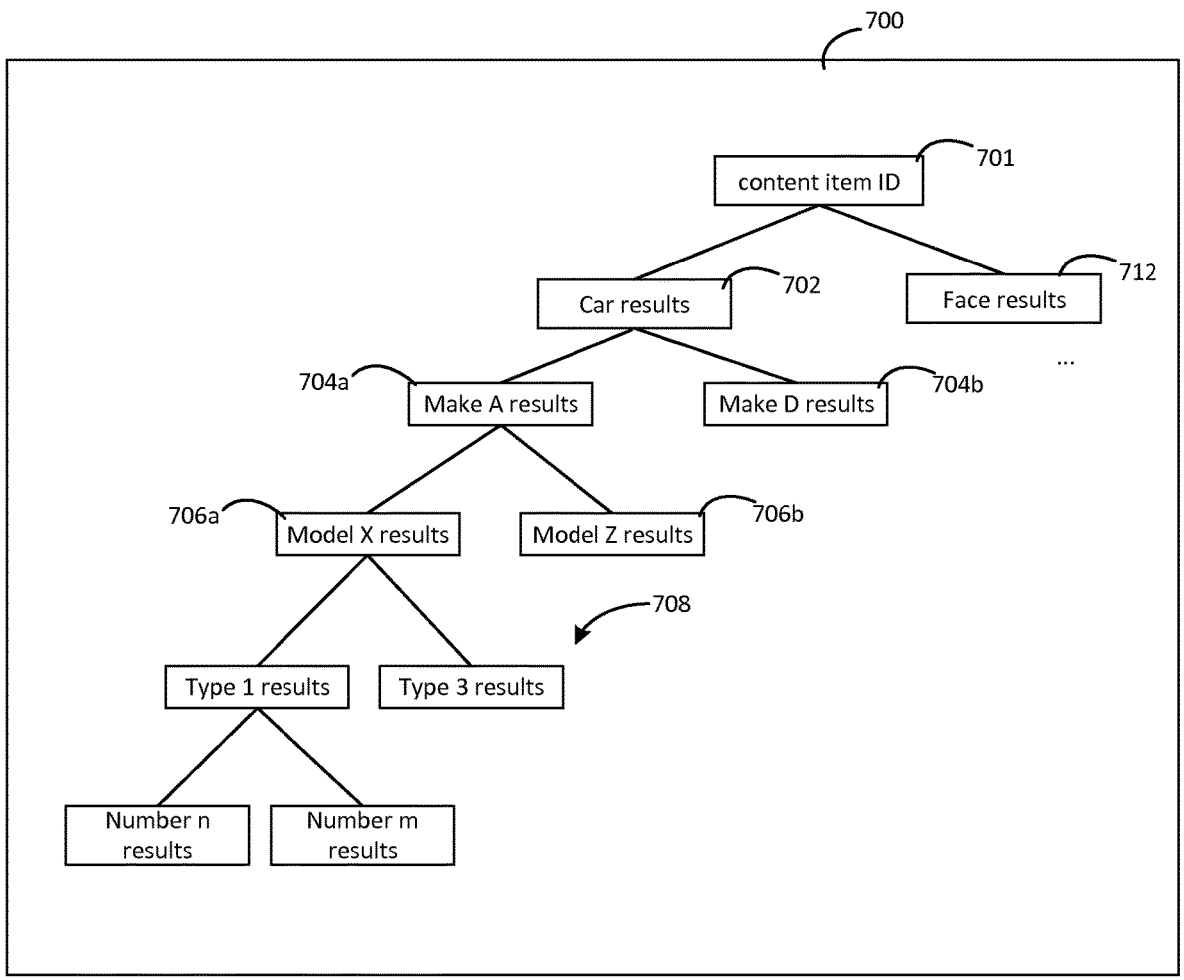
FIG. 7 shows a schematic illustration of an output tree of results, embodied in an output file.

To further aid illustration FIG. 7 shows a further example structure of an output file 700 for the kind of hierarchical classification described above, for a particular content item.

Because the content item has been classified by a "car" classifier as belonging to a "car" class, with a confidence score above a filtering threshold associated with the car classifier, results 702 for the car class are included.

Moreover, because that confidence exceeds a trigger threshold that associates the "car" class with a "make" classifier, this has caused the make classifier to be run on the content item in the manner described above. Here the results 704a, 704b for two "make" classes—"Make A" and "Make D" respectively—as provided by the make classifier have been included in the output file 700—as children of the car classification results—because the make classifier has returned classification results for those two classes with confidence scores that exceed a filtering threshold associated with the make classifier.

Note that there may be other make classes that the content item has been classified in relation to by the make classifier, for which results have not been returned because their confidence scores do not exceed that filtering threshold.

Moving another level down the hierarchy, a trigger threshold also associates the "Make A" class with a "Make A-model" classifier (a classifier for classifying different models of make A), and because the confidence score for the "Make A" class exceeds that trigger threshold, this has caused the Make A-model classifier to be run on the content item. Results 706a and 706b for model classes "Model X" and "Model Z" have been included—as children of the Make Y class results—because the confidence scores for those results exceeds a filter threshold associated with the Make A-model classifier. Again, there may be other model classes against which the content item has been classified, but for which the results have been filtered out because they are below the filtering threshold.

No sub-classification results are shown for the Make D class. This could be because no trigger settings are defined for the Make D class in the config file, or it could be that such trigger settings have been defined, but the (or none of the) trigger condition(s) defined by those settings are satisfied.

As can be seen, underneath the Model X class, type and number classification results 708 are selectively included, according to those same principles of filtering and triggering.

The output file 700 can also include results for other parallel branches of classification, such as facial classification results 712. Although not shown in FIG. 7, sub-classification results can be included in exactly the same way for these other branches, according to the filtering and triggering principles. A more detailed example of this is given in the JSON extract annexed to this description, which includes results for a branch of facial classification, as will be evident to the skilled person.

The output file can also include results for multiple content items, which may be distinguished by content identifiers such as a file name or address. A content item identifier 701 is shown associated with the results shown in FIG. 7 for the content item in question, to distinguish them from the results for other content items that may be included in the output file 700 (not shown).

The classification results can also include additional information, such as bounding box coordinates or other location data of an object or other structure correspond to a particular class (care, face etc.)

It will be appreciated that the embodiments described herein have been described only by way of example. Other variations and applications of the present invention will be apparent to the person skilled in the art in view of the disclosure given herein. The scope of invention is not defined by the described embodiments, but only by the appendant claims.

---

Annex-Example of final JSON output:

```
[
  {
    "car-detect": {
      "candidates": [
        [
          {
            "car-found": {
              "bounding_poly": [
                {
                  "x": 23,
                  "y": 201
                },
                {
                  "x": 1001,
                  "y": 201
                },
                {
                  "x": 1001,
                  "y": 569
                },
                {
                  "x": 23,
                  "y": 569
                }
              ],
              "confidence": 0.8676789999008179,
              "dets": [
                23,
                201,
                1001,
                569
```

| Annex-Example of final JSON output: |
|---|

```
                ],
                "prediction": "car-found"
            },
            "filename": "/tmp/viska_tests/JC2B25262BBoxster_Snapseed.jpg"
        }
    ]
  },
  "predictions": [
    {
      "car-found": {
        "bounding_poly": [
          {
            "x": 23,
            "y": 201
          },
          {
            "x": 1001,
            "y": 201
          },
          {
            "x": 1001,
            "y": 569
          },
          {
            "x": 23,
            "y": 569
          }
        ],
        "confidence": 0.8676789999008179,
        "dets": [
            23,
            201,
            1001,
            569
        ],
        "prediction": "car-found"
      },
      "filename": "/tmp/viska_tests/JC2B25262BBoxster_Snapseed.jpg"
      "subclassifiers": {
        "car-make": {
          "candidates": [
            [
              {
                "confidence": 0.9999999999819368,
                "prediction": "Porsche"
              }
            ]
          ],
          "predictions": [
            {
              "confidence": 0.9999999999819368,
              "prediction": "Porsche",
              "subclassifiers": {
                "porsche-model": {
                  "candidates": [
                    [
                      {
                        "confidence": 0.9927655331750239,
                        "prediction": "Boxster"
                      }
                    ]
                  ],
                  "predictions": [
                    {
                      "confidence": 0.9927655331750239,
                      "prediction": "Boxster",
                      "subclassifiers": {
                        "p-boxster-number": {
                          "candidates": [
                            [
                              {
                                "confidence": 0.7731982197210728,
                                "prediction": "718"
                              },
                              {
                                "confidence": 0.22653384033095098,
                                "prediction": "981"
```

| Annex-Example of final JSON output: |
|---|

```
                                    }
                                ]
                            ],
                            "predictions": [
                                {
                                    "confidence": 0.7731982197210728,
                                    "prediction": "718",
                                    "subclassifiers": {
                                        "p-boxster-718": {
                                            "candidates": [
                                                [
                                                    {
                                                        "confidence": 0.6482627974619951,
                                                        "prediction": "Base"
                                                    },
                                                    {
                                                        "confidence": 0.1951795246695854,
                                                        "prediction": "GTS"
                                                    },
                                                    {
                                                        "confidence": 0.15655767786841945,
                                                        "prediction": "S"
                                                    }
                                                ]
                                            ],
                                            "predictions": [
                                                {
                                                    "confidence": 0.6482627974619951,
                                                    "prediction": "Base"
                                                }
                                            ]
                                        }
                                    }
                                }
                            ]
                        }
                    ]
                }
            }
        ]
    },
    "face-detect": {
        "candidates": [
            [
                {
                    "face-found": {
                        "bounding_poly": [
                            {
                                "x": 600,
                                "y": 180
                            },
                            {
                                "x": 636,
                                "y": 180
                            },
                            {
                                "x": 636,
                                "y": 217
                            },
                            {
                                "x": 600,
                                "y": 217
                            }
                        ],
                        "confidence": 1.0,
                        "dets": [
                            600,
                            180,
                            636,
                            217
```

| Annex-Example of final JSON output: |
|---|

```
                    ],
                    "prediction": "face-found"
                },
                "filename": "/tmp/viska_tests/JC2B25262BBoxster_Snapseed.jpg"
            }
        ]
    ],
    "predictions": [
        {
            "face-found": {
                "bounding_poly": [
                    {
                        "x": 600,
                        "y": 180
                    },
                    {
                        "x": 636,
                        "y": 180
                    },
                    {
                        "x": 636,
                        "y": 217
                    },
                    {
                        "x": 600,
                        "y": 217
                    }
                ],
                "confidence": 1.0,
                "dets": [
                    600,
                    180,
                    636,
                    217
                ],
                "prediction": "face-found"
            },
            "filename": "/tmp/viska_tests/JC2B25262BBoxster_Snapseed.jpg",
            "subclassifiers": {
                "gender-classify": {
                    "candidates": [
                        [
                            {
                                "confidence": 0.9988460551641608,
                                "prediction": "male"
                            }
                        ]
                    ],
                    "predictions": [
                        {
                            "confidence": 0.9988460551641608,
                            "prediction": "male"
                        }
                    ]
                },
                "happiness-predictor": {
                    "candidates": [
                        [
                            {
                                "confidence": 0.5459604859352112,
                                "prediction": "happiness: 0.55"
                            }
                        ]
                    ],
                    "predictions": [
                        {
                            "confidence": 0.5459604859352112,
                            "prediction": "happiness: 0.55"
                        }
                    ]
                }
            }
        ]
    }
},
{
```

-continued

| Annex-Example of final JSON output: |
|---|
|    "duration": "0:00:04.431191"<br>  }<br>] |

The invention claimed is:

1. A computer-implemented method of processing a content item to extract information from the content item, the method comprising the following steps:
receiving the content item at a processing stage;
determining whether the content item satisfies a predetermined content condition, by i) providing content of the content item to a plurality of independently configured content analysers, each of which applies machine learning content analysis thereto, in order to make an independent determination of whether that predetermined content condition is satisfied, and provides a confidence score for that independent determination, and ii) making an overall determination of whether the content item satisfies that predetermined content condition based on the confidence scores provided by the independently configured content analysers for their respective independent determinations;
wherein an overall determination is made that the predetermined content condition is satisfied if a combined confidence condition is satisfied by two or more of the confidence scores in combination, or an individual confidence condition is satisfied by one of the two or more confidence scores individually;
using at least one higher-level content analyser to determine that the content item belongs to a predetermined content category, the predetermined content condition being one of multiple content conditions associated with that content category, wherein the content category is defined such that any content item that satisfies any one of the associated content conditions belongs to that content category, wherein the determining step is performed in response to determining that the content item contains belongs to that content category; and
wherein the content item is a visual content item and the predetermined content condition is that the content item contains a predetermined visual structure element, wherein the machine learning content analysis applied by each of the content analysers comprises image recognition applied to image data of the content item, so as to make an independent determination of whether that predetermined visual structure element is present, and wherein the content category corresponds to a category of visual structure and each of the content conditions corresponds to a different visual structure element in that category of visual structure.

2. The method according to claim 1, wherein the combined confidence condition is that each of the two or more confidence scores exceeds a lower threshold, and the individual confidence condition is that the confidence score exceeds a higher threshold.

3. The method according to claim 1, wherein the content item is a visual content item and the predetermined content condition is that the content item contains a predetermined visual structure element, wherein the machine learning content analysis applied by each of the content analysers comprises image recognition applied to image data of the content item, so as to make an independent determination of whether that predetermined visual structure element is present.

4. The method according to claim 3, wherein the visual content item includes additional content other than image data, and the method comprises classifying the additional content using at least one content analyser, wherein the overall determination is also based on the results thereof.

5. The method according to claim 4, wherein the additional content is classified using text classification.

6. The method according to claim 1 comprising accessing a configuration file and performing the determining step in dependence thereon, wherein an overall determination is made that the predetermined content condition is satisfied if a combined confidence condition is satisfied by two or more of the confidence scores in combination, or an individual confidence condition is satisfied by one of the two or more confidence scores individually, and wherein the configuration file defines the confidence conditions.

7. The method according to claim 1, comprising accessing a configuration file and performing the determining step in dependence thereon, wherein the configuration file defines the predetermined content condition, and the method comprises selecting the plurality of content analysers for making the said independent analyses based on the definition of the content condition in the configuration file.

8. The method according to claim 1, wherein each of the independently configured content analysers makes an independent determination of whether each of the associated content conditions is satisfied.

9. The method according to claim 1, comprising accessing a configuration file and performing the determining step in dependence thereon, wherein the configuration file comprises content analysis settings in a defined hierarchy, and the method comprises: selecting the at least one higher-level content analyser based on a first of the content analysis settings; and in response to determining that the content item belongs to the predetermined content category, selecting the plurality of independently configured content analysers for making the said independent analyses based on a second content analysis setting, which is a child of the first content analysis setting within the defined hierarchy.

10. Executable instructions stored on non-transitory media, the executable instructions configured, when executed on one or more processors of a content analysing system having a plurality of independently configured content analysers, to implement operations comprising:
receiving a content item to be analysed;
accessing a configuration file, which comprises content analysis settings in a defined hierarchy;
selecting at least a first of the content analysers based on a first set of the content analysis settings;
using the selected first content analyser to analyse the content item;

if the results of the analysis using the first content analyser satisfy a predetermined condition, selecting a second set of one or more of the independently configured content analysers based on a second set of the content analysis settings, which is a child of the first set of content analysis settings within the defined hierarchy, and using the selected second set of independently configured content analysers to analyse the content item;

wherein the results of the analysis by the first content analyser comprise a first set of classification results for a first set of content classes, and the results of the analysis by the second set of independently configured content analysers comprise a second set of classification results for a second set of content classes;

wherein the predetermined condition is a trigger condition associated with a first content class of the first set of content classes in the configuration file, the second set of independently configured content analysers being used to analyse the content item if the classification result for the first content class satisfies the trigger condition associated with the first confidence class; and wherein the classification result for the first content class is stored in an output tree;

wherein if the trigger condition is satisfied by the confidence score for the first content class such that the second set of content analysers is to analyse the content item, at least one classification result of the second set of classification results is stored in the output tree, as a child of the classification result for the first content class.

11. The executable instructions of claim 10, wherein the predetermined condition is defined in the configuration file.

12. The executable instructions according to claim 10, comprising filtering the first set of classification results for storage in the output tree based on a first set of filtering settings associated with the first content analyser in the output file, wherein filtered-out classification results are not stored in the output tree.

13. The executable instructions according to claim 10, wherein the classification results comprise confidence scores.

14. A content processing system comprising:
an input configured to receive a content item for processing; and
one or more processors configured to implement operations comprising:
determining whether the content item satisfies a predetermined content condition, by i) providing content of the content item to a plurality of independently configured content analysers, each of which applies machine learning content analysis thereto, in order to make an independent determination of whether that predetermined content condition is satisfied, and provides a confidence score for that independent determination, and ii) making an overall determination of whether the content item satisfies that predetermined content condition based on the confidence scores provided by the independently configured content analysers for their respective independent determinations;
wherein an overall determination is made that the predetermined content condition is satisfied if a combined confidence condition is satisfied by two or more of the confidence scores in combination, or an individual confidence condition is satisfied by one of the two or more confidence scores individually;
using at least one higher-level content analyser to determine that the content item belongs to a predetermined content category, the predetermined content condition being one of multiple content conditions associated with that content category, wherein the content category is defined such that any content item that satisfies any one of the associated content conditions belongs to that content category, wherein the determining step is performed in response to determining that the content item contains belongs to that content category; and
wherein the content item is a visual content item and the predetermined content condition is that the content item contains a predetermined visual structure element, wherein the machine learning content analysis applied by each of the content analysers comprises image recognition applied to image data of the content item, so as to make an independent determination of whether that predetermined visual structure element is present, and wherein the content category corresponds to a category of visual structure and each of the content conditions corresponds to a different visual structure element in that category of visual structure.

* * * * *